United States Patent [19]

Chen

[11] 4,401,787

[45] Aug. 30, 1983

[54] LATEX COMPOSITIONS FOR WATER RESISTANT COATING APPLICATIONS

[75] Inventor: Tsang J. Chen, Rochester, N.Y.

[73] Assignee: Eastman Kodak Company, Rochester, N.Y.

[21] Appl. No.: 281,133

[22] Filed: Jul. 7, 1981

[51] Int. Cl.$^3$ ............................................. C08L 67/02
[52] U.S. Cl. .................................. 524/603; 430/531; 430/533; 524/601; 524/901; 528/293
[58] Field of Search ....................... 524/603, 601, 904; 528/293, 295; 430/531, 533

[56] References Cited

U.S. PATENT DOCUMENTS

| | | | |
|---|---|---|---|
| 3,563,942 | 2/1971 | Helberger | 260/29.2 |
| 3,725,351 | 4/1973 | Harrison et al. | 528/295 |
| 4,097,282 | 6/1978 | Noonan et al. | 528/295 |
| 4,214,047 | 7/1980 | Chen | 430/448 |
| 4,247,627 | 1/1981 | Chen | 430/507 |

FOREIGN PATENT DOCUMENTS 55-99947  1/1979  Japan.
55-99950  1/1979  Japan.

*Primary Examiner*—Theodore E. Pertilla
*Attorney, Agent, or Firm*—John R. Everett

[57] ABSTRACT

Polyester latex compositions comprising an aqueous continuous phase having dispersed therein loadable hydrophobic polyester particles are disclosed. In the latex (a) substantially all of the polyester particles are less than about 0.2 micron in diameter;
(b) the polyester contains from about 0.5 to 5.0 mole percent dicarboxylic acid derived repeating units having a component selected from the group of salts consisting of alkali metal or ammonium iminodisulfonyl and alkali metal or ammonium sulfonate.

The latex contains from 0 to 3% surfactant based on the total weight of the polyester.

The polyester is optionally loaded with a hydrophobe. Coated layers of the composition are water resistant.

18 Claims, No Drawings

LATEX COMPOSITIONS FOR WATER RESISTANT COATING APPLICATIONS

FIELD OF THE INVENTION

This invention relates to polymeric latex compositions, methods of making such compositions and the use of such compositions in forming water resistant coatings.

BACKGROUND OF THE INVENTION

Polymeric compositions comprising highly ionic water dispersible polyester resins have been found useful in numerous industrial applications, including textile finishing, photoresists and laminating adhesives. Coatings prepared from these polymeric compositions are water sensitive. Such coatings often create problems such as blocking in high humidity and losing integrity or eventually dissolving when exposed to an aqueous environment.

Attempts to make latex compositions from hydrophobic polyesters by homogenizing processes using low-boiling, water-immiscible organic solvents have been generally unsuccessful. These methods produce large polymer particles which settle rapidly on storage.

U.S. Pat. No. 3,563,942 discloses polyester latex compositions in which the polyesters contain about 1-2 percent moles metal salt of a sulfonated aromatic compound such as dimethyl 5-sodiosulfoisophthalate. The latex compositions are prepared by dissolving the polyester in water immiscible organic solvents, and subsequently homogenizing in an aqueous medium containing a large excess of surfactant. Solvents are then removed by evaporation. However, the polymeric latex compositions produced according to this method are also susceptible to water because of high levels of surfactant. In addition the coated layers are hazy or opaque and the films lack the desired physical strength.

There is a continuing need for polymeric latex compositions from which water resistant coatings can be prepared. Such water resistant coatings would be extremely useful for coating objects exposed repeatedly to an aqueous environment.

SUMMARY OF THE INVENTION

The present invention provides novel latex compositions from which water resistant coatings are prepared. The compositions comprise an aqueous continuous phase having dispersed therein loadable hydrophobic polyester particles characterized in that (a) substantially all of the polyester particles are less than about 0.2 micron in diameter;

(b) the acid component of the polyester contains from about 0.5 to 5.0 mole percent dicarboxylic acid derived repeating units having a component selected from the group of salts consisting of alkali metal or ammonium iminodisulfonyl and alkali metal or ammonium sulfonate; and (c) said latex contain from 0 to 3% surfactant based on the total weight of the polyester.

The term "loadable" refers to the ability of the polyester latex to pass the "Loadable Polymer Particle Test" referred to hereinafter.

The present invention also provides a method for making such compositions. The process comprises the steps of:

(a) dissolving from 0.1 to 20%, preferably 2%, by weight of a loadable hydrophobic polyester containing from about 0.5 to 5.0 mole percent dicarboxylic acid derived repeating units having a component selected from the group of salts consisting of alkali metal or ammonium of iminodisulfonyl and alkali metal or ammonium sulfonate in a water-miscible organic solvent;

(b) adding to the solution of (a) from about 20 to about 300 weight percent of water; and (c) removing the organic solvent from (b) to form a latex; and (d) adding from about 0 to 3% by weight of surfactant, based on the total weight of the polyester, to the latex.

PREFERRED EMBODIMENTS OF THE INVENTION

In preferred embodiments of the present invention the latex compositions include one or more hydrophobic compounds dissolved, distributed in or otherwise associated with the polyester particles of the latex. Such polyesters particles are sometimes referred to hereinafter as "loaded polymer particles."

Preferred polyesters, according to the present invention have the structure:

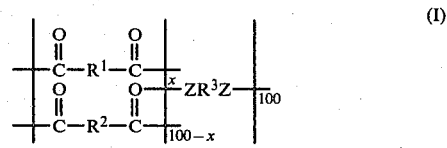

wherein $R^1$ represents a member selected from the group of salts consisting of alkali metal or ammonium iminodisulfonyldiarylene, arylsulfonyliminosulfonylarylene, sulfoarylene, sulfoalkoxyarylene, sulfoaryloxyarylene, sulfocycloalkylene, sulfocycloalkyloxycycloalkylene and sulfoalkoxycycloalkylene;

$R^2$ represents arylene, alkylene or cycloalkylene;

$R^3$ represents a straight or branched chain alkylene having from about 2 to 12 carbon atoms, cycloalkylene, arylene ether or alkylene ether;

Z is —O— or —NH—; and x is 0.5 to 5.0 mole percent.

Especially preferred polyesters according to Formula I include $R^1$ substituents derived from a dicarboxylic acid having an alkali metal or ammonium salt of iminodisulfonyldiphenylene, tolylsulfonyliminosulfonylphenylene, sulfophenylene, sulfophenoxyphenylene, sulfopropoxyphenylene, sulfocyclohexylene, or sulfocyclohexyloxycyclohexylene. Examples of particularly preferred $R^1$ substituents included in the foregoing classes include sodioiminosulfonyldiphenylene; 5-(N-potassio-p-tolylsulfonyliminosulfonyl)-1,3-phenylene; 5-sodiosulfo-1,3-phenylene; 5-(3-sodiosulfopropoxy)-1,3-phenylene; 5-(p-sodiosulfophenoxy)-1,3-phenylene; 5-sodiosulfo-1,3-cyclohexylene; and 5-(4-sodiosulfocyclohexyloxy)-1,3-cyclohexylene.

DETAILS OF THE INVENTION

The polyesters are prepared employing a conventional two-stage polyesterification technique. For example, initially, the reactants (diols and dicarboxylic acids or their respective derivatives) are weighed into a 100 ml, round-bottomed polymerization flask. The flask is flushed with a slow stream of nitrogen for 30 minutes before it is immersed into a 235° C. salt bath. While under a nitrogen atmosphere, the reactants are allowed to come to a clear melt before adding two drops of the catalyst, tetraisopropyl orthotitanate. After the first stage of the polymerization, the reaction is placed under a 0.2 mm atmosphere with constant stirring controlled by a Cole-Parmer Constant Speed and Torque Control Unit. The second stage of the polyesterification is completed when the desired degree of inherent viscosity has been attained.

Useful diols include alkylene glycols, including dialkylene glycols, trialkylene glycols and cyclic diols. All these materials are well known in the art.

Useful cyclic diols include 1,4-cyclohexanediol; 1,4-cyclohexanedimethanol; 1,4-cyclohexanediethanol; 1,4-bis(2-hydroxyethoxy)cyclohexane; 1,4-benzenedimethanol; and 1,4-benzenediethanol.

Useful alkylene glycols include cyclohexylenebis(oxyethylene) oxydiethylene; ethylenebis(oxyethylene); ethylene glycol; diethylene glycol; triethylene glycol; 1,2-propanediol; 1,3-propanediol; 1,4-butanediol; 2,3-butanediol; 1,5-pentanediol; 1,6-hexanediol; 1,7-heptanediol; 1,8-octanediol; 1,9-nonanediol; 1,10-decanediol; 1,12-dodecanediol; neoopentyl glycol; 2,2,4-trimethyl-1,16-hexanediol and 4-oxa-2,6-heptanediol.

Useful alkylene ethers include cyclohexylenebis(oxyethylene); oxydiethylene and ethylenebis(oxyethylene). Useful arylene ethers include oxydiphenylene and oxybis(phenylenemethylene), oxydiphenylene, oxybis(phenylenemethylene)

Useful carboxylic acids include aliphatic, alicyclic, and aromatic dicarboxylic acids or their derivatives, such as esters, anhydrides, and acid halides. Such acids include succinic acid, sebacic acid, 2-methyladipic acid, diglycolic acid, thiodiglycolic acid, fumaric acid, cyclohexane-1,3-dicarboxylic acid, cyclohexane-1,4-dicarboxylic acid, cyclopentane-1,3-dicarboxylic acid, 2,5-norbornanedicarboxylic acid, phthalic acid, isophthalic acid, terephthalic acid, t-butylisophthalic acid, 2,6-naphthalenedicarboxylic acid, 1,4- naphthalenedicarboxylic acid, 1,5-naphthalenedicarboxylic acid, 1,7-naphthalenedicarboxylic acid, 4,4'-diphenic acid, 4,4'-sulfonyldibenzoic acid, 4,4'-oxydibenzoic acid, binaphthyldicarboxylic acid, and 9,10-triptycenedicarboxylic acid.

A listing of representative compounds which are useful in making that portion of the polyester containing the salts of alkali metal or ammonium sulfonates and alkali metal or ammonium iminodisulfonyl components include 5-(N-potassio-p-tolylsulfonyliminosulfonyl-1,3-benzenedicarboxylic acid; 5-(3-sodiosulfopropoxy-1,3-benzenedicarboxylic acid; 5-(p-sodiosulfophenoxy)-1,3-benzenedicarboxylic acid; 5-sodiosulfo-1,3-cyclohexanedicarboxylic acid; 5-(4-sodiosulfocyclohexyloxy)-1,3-cyclohexanedicarboxylic acid; 3,3'-[(sodioimino)-disulfonyl]dibenzoic acid; 3,3'-[(potassioimino)disulfonyl]dibenzoic acid; 3,3'-[(lithioimino)disulfonyl]-dibenzoic acid; 4,4'-[(lithioimino)disulfonyl]dibenzoic acid; 4,4'-[(sodioimino)disulfonyl]dibenzoic acid, 4,4'-[(potassioimino)disulfonyl]dibenzoic acid; 3,4'-[(lithioimino)disulfonyl]dibenzoic acid; 3,4'-[(sodioimino)-disulfonyl]dibenzoic acid; 5-[4-chloronaphth-1-ylsulfonyl(sodioimino)sulfonyl]isophthalic acid; 4,4'-[(potassioimino)disulfonyl]dinaphthoic acid; 4-[p-5-[N-sodio-p-tolylsulfonyliminosulfonyl]-1,5-naphthalene dicarboxylic acid; 5-[N-lithio-n-hexylsulfonyliminosulfonyl]isophthalic acid; dimethyl 3,3'-[(sodioimino)-disulfonyl]dibenzoate; dimethyl 5-sodiosulfoisophthalate; dimethyl 5-(4-sodiosulfophenoxy)isophthalate; dimethyl 4,4'-[sodioimino)disulfonyl]dibenzoate; dimethyl 5-(N-potassio-para-tolylsulfonyliminosulfonyl)isophthalate and functional derivatives of the foregoing compounds.

The following listed polymers are examples of the useful polyesters of the present invention:
poly[2,2'-oxydiethylene isophthalate-co-5-sodiosulfo-1,3-cyclohexanedicarboxylate (98:2)];
poly[ethylenebis(oxyethylene) 5-sodiosulfo-1,3-cyclohexanedicarboxylate-co-terephthalate (4:96)];
poly[ethylenebis(oxyethylene) isophthalate-co-5-(4-sodiosulfophenoxy)-1,3-benzenedicarboxylate (97:3)];
poly[2,2'-oxydiethylene 5-(4-sodiosulfophenoxy)-1,3-benzenedicarboxylate-co-terephthalate (4:96)];
poly[2,2'-oxydiethylene 3,3'-sodioiminodisulfonyldibenzoate-co-terephthalate (2:98)];
poly[ethylenebis(oxyethylene) isophthalate-co-3,3'-sodioiminodisulfonyldibenzoate (97:3)];
poly{ethylenebis(oxyethylene) isophthalate-co-5-[N-potassio-N-(4-tolylsulfonyl)sulfamoyl]1,3-benzenedicarboxylate (96:4)};
poly{2,2'-oxydiethylene 5-[N-potassio-N-(4-tolylsulfonyl)sulfamoyl]1,3-benzenedicarboxylate-co-terephthalate (97:3)}.
poly[2,2'-oxydiethylene isophthalate-co-5-sodiosulfo-1,3-benzenedicarboxylate (96:4)]
poly[2,2'-oxydiethylene isophthalate-co-5-sodiosulfo-1,3-benzenedicarboxylate (98:2)]

In making loadable latex compositions according to this invention, from 0.1 to 20%, preferably at least 2%, by weight of polyester is dissolved in a water miscible organic solvent. In some applications from 10 to 20% by weight of polyester is dissolved. Useful water-miscible organic solvents in which the loadable polyesters are soluble include dimethylformamide, dimethyl sulfoxide, tetrahydrofuran, acetone, dioxane, formic acid, phenol, and mixtures of such solvents.

Water is blended rapidly with the polyester solution to insure homogeneous nucleation. The organic solvent is then removed from the blend by evaporation or other conventional means, such as dialysis of diafiltration, to form the loaded latex composition.

No surfactants need be used in forming the latex composition. Indeed, the surfactant free polyester latices form haze free highly water resistant coatings. However for some coating processes, surfactants are useful. In the latter cases no more than 3% by weight of surfactant, based on the total weight of the polyester, should be mixed with the latex. At above 3% by weight, haze increases and water resistance decreases substantially. Surfactants are mixed with the latex anytime before a layer is coated.

The loaded polyester latex compositions of this invention consist of an aqueous continuous phase and a dispersed or discontinuous polyester phase in which one or more hydrophobic compounds is distributed, dissolved or otherwise associated with the polyester particles.

The process of loading (distributing, dissolving or associating) a hydrophobic compound within the loadable polymer particles is accomplished in the following manner, as described in U.S. Pat. No. 4,214,047.

The hydrophobic compound (or hydrophobe) to be loaded is dissolved in a water-miscible organic solvent, and an aqueous latex consisting essentially of water as a continuous phase and loadable polyester particles as a dispersed phase is then blended into the water-miscible organic solvent containing the hydrophobe. Blending is undertaken so that the hydrophobe remains in solution and the loadable polymer particles remain dispersed. That is, separation of the hydrophobe or coagulation of the polymer particles is avoided.

By avoiding separation or coagulation of the hydrophobe or the polymer particles, a two-phase mixture is established in which the continuous phase the mixture of water-miscible organic solvent and water constitutes one phase and the polymer particles constitute a second phase. Initially, the hydrophobe is within the water-miscible organic solvent. In the two phase mixture resulting from blending, the hydrophobe is brought into intimate association with both the continuous and the dispersed phases. The hydrophobe is then free to distribute itself between these phases based on its relative solubilities therein. Dilution of the water-miscible organic solvent with water by blending has the effect of reducing the affinity of the hydrophobe for the continuous phase. Thus, the introduction of water has the effect of driving or shifting the equilibrium distribution of the hydrophobe away from the continuous phase and toward the dispersed phase. The presence of water (or an increased amount of water, if some water was initially present in the water-miscible organic solvent) causes the hydrophobe to redistribute itself between the continuous and dispersed phases. In this way a portion of the hydrophobe becomes dispersed or dissolved in the polymer particles, so that the polymer particles are loaded with hydrophobe. This loading procedure requires that the hydrophobe remain dissolved until associated with the polymer particle.

In most instances all the water desired to dilute the water-miscible organic solvent and shift the equilibrium distribution of the hydrophobe is present in the aqueous latex during initial blending. Where it is desired to introduce additional water, as where a concentrated latex is employed, additional water can be blended with the loaded latex composition resulting from the initial step of blending. The additional water has the effect of further reducing the affinity of the hydrophobe for the continuous phase. This will further drive or shift the equilibrium distribution of the hydrophobe away from the continuous phase toward the dispersed phase and will further contribute to loading the polymer particles with hydrophobe.

While blending of water and loadable polymer particles with the water-miscible organic solvent containing hydrophobe dissolved therein results in significant loading of the hydrophobe into the polymer particles, a substantial portion of the hydrophobe remains in the continuous phase dissolved in the water-miscible organic solvent. Further loading of the hydrophobe into the polymer particles can be achieved by removing water-miscible organic solvent from the continuous phase. This has the effect of further increasing the affinity of the hydrophobe for the dispersed phase. It is preferred to remove at least a major portion—in other words, at least about half—of the water-miscible organic solvent. This drives or shifts the equilibrium distribution of the hydrophobe away from the continuous phase toward the dispersed phase. A still higher proportion of hydrophobe becomes dissolved or dispersed in the polymer particles so that their loading is further increased.

It is unnecessary to practice all of the loading steps indicated above following initial blending and loading. For certain applications the loaded latex composition resulting from initial blending and loading is used directly, or the loaded polymer particles can be separated from the continuous phase and used directly.

Where it is desired to form hydrophilic colloid coatings, as in photographic applications and elements, the polymer particles of the aqueous latex are chosen to be readily dispersible in a hydrophilic colloid composition, such as an aqueous gelatin solution. This is accomplished by employing particles consisting essentially of a loadable polyester of the type defined herein. This allows the hydrophilic colloid composition to be uniformly blended with the loaded latex composition prepared by at least the initial blending step and preferably a combination of the loading steps described above. The resulting hydrophilic colloid containing loaded latex composition is then coated onto a suitable substrate, such as a conventional photographic support. Water and, if any remains present, water-miscible organic solvent are then removed from the coating so that a solid hydrophilic colloid coating results. Depending upon the specific photographic application, the hydrophilic coating containing the loaded polymer particles is the sole coating on the support, an undercoat, interlayer or overcoat. In one preferred form the loaded polymer particles are incorporated in a gelatino-silver halide emulsion layer of a photographic element.

The water-miscible organic solvents useful in the practice of this loading process are those which:

(a) can be dissolved in (i.e., are "miscible" with) distilled water at 20° C. to the extent of at least about 20 parts by volume of solvent in 80 parts by volume of water;

(b) have boiling points (at atmospheric pressure) above about $-10°$ C.;

(c) do not detrimentally react chemically with aqueous latexes containing the loadable polymer particles which are useful in the practice of this process; and (d) do not dissolve more than about 5 weight percent of such loadable polymer particles in the aqueous latex at 20° C.

Regarding requirement (c) for useful solvents, reaction between the solvent and polymer is possible under certain circumstances, but is believed to be unlikely. Typical non-limiting examples of such useful water-miscible organic solvents are water-miscible alcohols, ketones and amides (e.g. acetone, ethyl alcohol, methyl alcohol, isopropyl alcohol, dimethylformamide, methyl ethyl ketone), tetrahydrofuran, N-methyl-2-pyrrolidone, dimethyl sulfoxide and mixtures thereof. Of these, acetone, dimethylformamide and/or tetrahydrofuran are preferred when the hydrophobic material in question is soluble therein.

The latices which are employed as starting materials in the practice of the process consist essentially of water as a continuous phase and loadable polyester particles as a dispersed phase. The loadable polyester particles which are useful in the practice of the process are chosen from the polyesters which meet the Loadable Polymer Particle Test.

LOADABLE POLYMER PARTICLE TEST

At 25° C., the loadable polyester particles being tested must (a) be capable of forming a latex with water at a polyester particle concentration of from 10 to 20 percent by weight, based on total weight of the latex, and (b) when 100 ml of the latex is then mixed with an equal volume of the water-miscible organic solvent to be employed in forming the loaded polymeric latex composition desired, stirred and allowed to stand for 10 minutes, exhibit no observable coagulation of the polyester particles.

The latices are characterized in that the loadable polyester particles are generally highly dispersed as compared to coupler solvent and similar hydrophobic particle dispersions in hydrophilic colloid coatings. The loadable polyester particles exhibit an average diameter in the range of from 0.02 to 0.2 micron, preferably in the range of from about 0.02 to 0.08 micron. Although some swelling can occur during loading, the loaded polyester particles also typically and preferably fall within these same ranges of average diameters.

To be considered a hydrophobic compound as that term is employed herein the compound must be essentially insoluble in distilled water at 25° C. Preferably the dissolved concentration of hydrophobe in water under these conditions should be less than 0.5 percent by weight, based on the weight of the water. Any such hydrophobe is employed in the practice of this process which can be dissolved in a liquid consisting of one or a mixture of water-miscible organic solvents. Preferably the hydrophobe must be soluble in a concentration of at least 5 percent by weight, based on the total weight of the water-miscible organic solvent and dissolved hydrophobe. In practice minor amounts of essentially diluent materials, such as minor amounts of water commonly entrained in water-miscible solvents, are associated with the blended hydrophobe and water-miscible organic solvent; however, the hydrophobe and water-miscible organic solvent or solvents are chosen so that additional materials, such as pH or other modifiers—e.g. acid or alkali—are not required to dissolve the hydrophobe.

Specifically preferred hydrophobic photographic addenda of this type include those used to perform coupling, silver halide development, oxidized developer scavenging, spectral sensitizing or desensitizing, diffusion transfer dye image-forming and visible or ultraviolet light absorbing functions when incorporated in a silver halide photographic element. Other hydrophobic photographic addenda encompass those used in silver halide photographic elements as brighteners, antioxidants, silver halide solvents, bleachable dyes in silver-dye-bleach imaging processes and the like. All those hydrophobic photographic addenda which have been conventionally introduced into hydrophilic colloid layers of photographic elements in coupler-solvent and similar high boiling organic solvent droplets are ideally suited for use in the practice of this invention.

In terms of end photographic uses all of the hydrophobic photographic addenda useful as hydrophobes in the practice of this process can be introduced in their conventional concentrations and locations within photographic materials and elements. Such photographic materials and elements are well known to chemists skilled in the photographic arts and need not be discussed in detail herein. Photographic materials in the preparation of which the process of the present invention is especially useful include, for example, image transfer materials, physical development materials, radiographic materials, dry development systems, color-forming materials, and the like, such as are described in *Product Licensing Index*, Vol. 92, December, 1971, pages 107–110, and in British Pat. No. 923,045.

Examples of some of the photographically useful loaded latex compositions of the present invention include compositions which comprise a loadable polyesters, as described herein associated with one or more hydrophobic materials, as described above. Generally the amount of hydrophobe which is present in intimate association with the polyester particles of the latex is anywhere within the range of from 1:40 to 3:1 in terms of a weight ratio of hydrophobe to loadable polymer. It is preferred that the weight ratio of hydrophobe to loadable polyester in the latex be from about 1:10 to 2:1, optimally from about 1:3 to 1:1.

Generally the proportion of aqueous latex added to the water-miscible organic solvent containing hydrophobe is maintained in the volume ratio of 1:4 to 4:1, preferably 1:2 to 2:1. Not all of the water added, however, need be present in the aqueous latex. It is contemplated that a portion of the water which might be blended in the aqueous latex is added subsequent to blending the aqueous latex and water-miscible organic solvent.

The loaded latex compositions with hydrophilic colloid dispersed therein can be coated onto a useful substrate, such as a conventional photographic support, using conventional techniques. It is specifically contemplated to coat compositions of this type containing photographic hydrophobes using coating hoppers and other apparatus conventionally employed in the photographic arts for forming single or multiple coatings on photographic supports. Useful coating techniques and supports are described in the *Product Licensing Index*, Vol. 92, pages 107–110, December, 1971, and the publications referred to therein.

Although these preferred embodiments are useful in the photographic industry, the present invention is not limited to photographic materials and processes, but is useful wherever it is deemed desirable to obtain a distribution of a hydrophobe through a polymeric material. Although the distribution of hydrophobe through polymeric material is generally used ultimately in a layer on a support, other end uses are contemplated. For example, useful hydrophobes include hydrophobic insecticides, herbicides, miticides, hormones, vitamins, enzymes and the like (which meet the requirements set out above). It will be appreciated that the end use of such load polyester latexes do not necessarily involve a support.

The following examples are presented to further illustrate the present invention.

EXAMPLE 1

Preparation of a Polyester Latex from poly[2,2'-oxydiethylene isophthalate-co-5-sodiosulfo-1,3-benzenedicarboxylate (96:4)]

A polyester solution was prepared by dissolving 40 g of poly[2,2'-oxydiethylene isophthalate-co-5-sodiosulfo-1,3-benzenedicarboxylate (96:4)] in 400 ml of tetrahydrofuran (THF) at room temperature with moderate stirring. The solution was then added to 300 ml of distilled water with rapid agitation to give a thin bluish solution. After stripping off the THF and part of the water on a rotary evaporator, a stable latex with 19.1% solids content was obtained. It gave a clear, glossy and non-tacky coating which retained its integrity after immersion in water for 24 hours at room temperature.

EXAMPLE 2

Preparation of a Polyester Latex from poly[2,2'-oxydiethylene isophthalate-co-5-sodiosulfo-1,3-benzenedicarboxylate (98:2)]

The same process was repeated as in Example 1 with poly[2,2'-oxydiethylene isophthalate-co-5-sodiosulfo-1,3-benzenedicarboxylate (98.2)]. A good, stable latex resulted. The total solid was found to be 17.0%. It also coated clear and possessed all the properties mentioned in Example 1.

EXAMPLE 3

Preparation of Yellow Color Coupler Loaded Latex

To a solution of 1 g of the coupler 2-[4-(4-benzyloxyphenylsulfonyl)phenyl]-N-(2-chloro-5-hexadecylsulfonamidophenyl)-4,4-dimethyl-3-oxo-pentanamide in 20 ml of acetone was added 20 g of diluted latex from Example 2 containing one gram of polyester. The acetone was then removed on a rotary evaporator at 55° C. A stable coupler dispersion resulted.

EXAMPLE 4

Preparation of Yellow Color Coupler Loaded Latex

Example 3 was repeated using the latex prepared from Example 1. Again, a good stable coupler dispersion resulted.

EXAMPLE 5

Preparation of Optical Brightener Loaded Latex

To 0.1 gm of Uvitex OB [2,5-bis(5-t-butyl-2-benzoxazolyl)thiophene sold by Ciba Geigy] in 10 ml of THF was added 16 gm of diluted latex (13.3%) from Example 1. After stripping off the THF and part of the water on a rotary evaporator, a uniform dispersion of Uvitex OB was obtained (total weight of dispersion ~10 g). Coatings of the dispersion in the presence of gelatin were strongly fluorescent under UV radiation.

EXAMPLE 6

Preparation of Optical Brightener Loaded Latex

A similar experiment to Example 5 was carried out using the latex from Example 2. A good dispersion of Uvitex OB was obtained which gave a clear, non-tacky coating with gelatin.

EXAMPLE 7

This example compares the surfactant free latices of this invention with a surfactant containing latices such as are disclosed in U.S. Pat. No. 3,563,942.

Latex (A) was prepared according to the present invention.

Latex (B) was prepared according to Example 10 of U.S. Pat. No. 3,563,942.

Latex (A)

15 g of the polymer of Example 1 of U.S. Pat. No. 3,563,942, poly[ethylene sebacate-co-5-sodiosulfo-1,3-benzenedicarboxylate-co-terephthalate (53.4:0.7:45.9)] were dissolved in 75 ml of tetrahydrofuran. This solution was then diluted with 225 ml of acetone to form a clear solution. This latter solution was poured into 150 g of water with stirring. The solvents were removed on a rotary evaporator and the resulting dispersion concentrated to 22.7% solids.

Latex (B)

21.5 g of the same polyester used in Dispersion (A) were dissolved in 45.5 g of methyl ethyl ketone and 45.5 g of toluene. The solution was emulsified in a Waring blender for 10 minutes in the presence of 2.15 g of Triton 770 surfactant, (sodium salt of an alkylaryl polyether sulfate sold by Rohm and Haas Co.), and 125 g of deionized water. Extensive foaming was observed. The solvents were removed at 75° C. on a rotary evaporator and the latex was diluted to 9.2% solids.

The properties of the two lattices are summarized in Table I.

TABLE 1

| | Latex (A) | Latex (B) |
| --- | --- | --- |
| Total Solids | 22.7% | 9.2% |
| Keeping stability (room temperature) | No sludges after 4 mos. | Sludges formed overnight |
| Particle sizes | 0.05 to 0.15μ | Few particles of 0.1μ, most were 0.2μ and up. No upper limit was determined because of the sludge formation. |
| Coatings on poly(ethylene terephthalate) support | Clear, good adhesion resistant to water | Hazy, incoherent film, sensitive to water |

The data of Table I shows that the surfactant free lattices of the present invention provide clear coatings having better adhesion and film properties and better resistance to water compared to similar lattices containing high levels of surfactant.

EXAMPLE 8

Latex A of Example 7 was prepared except that the dispersion included the same amount of surfactant included in Latex B of Example 7. A milky dispersion was obtained. The solvents were removed with a rotary evaporator at 50° C. (excessive foaming) and the final dispersion was filtered with great difficulty. On keeping overnight, sludge and precipitation of large particles was noticed. The upper layer was filtered again and coated to produce a hazy film which turned opaque in hot water, indicating poor water resistance. The total solids content of the filtered latex was 8.8%.

This example again demonstrates the detrimental effect of a large excess of surfactant on the water resistance of coatings prepared from the same polymer of the present invention.

EXAMPLE 9

In this example the effect of surfactant on coatings made from the lattices of this invention is shown. Lattices were prepared with poly[2,2'-oxydiethylene isophthalate-co-5-sodiosulfo-1,3-dicarboxylate (98:2)] and spiked with varying concentrations of Triton 770 surfactant. The latex samples were poured into aluminum foil pans, allowed to dry, and immersed in water at room temperature. Evaluation of the coatings' resistance to water is provided in the following Table 2. The maximum amount of surfactant which can be tolerated and still maintain moderate resistance to water is about 3% by weight based on the weight of the polyester.

TABLE 2

| Latex | % Triton 770 (Dry) w/Respect to Polymer | Coatings Immersed in Water at Room Temperature |
|---|---|---|
| A | 0 | Totally clear after 2 hr. Excellent adhesion and film strength. |
| B | 0.5 | Slightly hazy after 5 min. Good adhesion and strength after 2 hr. |
| C | 1.0 | Turned hazy after 3 min. Good adhesion and moderate strength after 2 hr. |
| D | 2.0 | Turned hazy after 2 min. Fair adhesion and moderate strength after 2 hr. |
| E | 3.0 | Turned hazy in 1 min. Very hazy with moderate strength and adhesion after 2 hr. |
| F | 4.0 | Turned hazy in <30 sec.; very hazy with weakened film strength and poor adhesion after 2 hr. |
| G | 5.0 | Turned hazy in <30 sec. Extremely hazy with poor film integrity and poor adhesion after 2 hr. |
| H | 7.0 | Turned hazy in <30 sec. Extremely hazy with poor film integrity and poor adhesion after 2 hr. |
| I | 10.0 | Turned hazy in <20 sec. Extremely hazy with no film integrity and poor adhesion after 2 hr. |

The invention has been described in detail with particular reference to certain preferred embodiments thereof, but it will be understood that variations and modifications can be effected within the spirit and scope of the invention.

I claim:

1. A latex composition, from which water resistant coatings can be prepared, comprising an aqueous continuous phase having dispersed therein loadable hydrophobic polyester particles characterized in that
   (a) substantially all of the polyester particles are less than about 0.2 microns in diameter;
   (b) the acid component of the polyester contains from about 0.5 to 5.0 mole percent dicarboxylic acid derived repeating units having a component selected from the group of salts consisting of alkali metal or ammonium iminodisulfonyl and alkali metal or ammonium sulfonate; and
   (c) said latex contains from 0 to 3% surfactant based on the total weight of the polyester.

2. A latex composition as in claim 1 wherein said polyester has the structure:

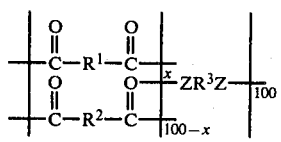

(I)

wherein

R$^1$ represents a member selected from the group of salts consisting of alkali metal or ammonium iminodisulfonyldiarylene, arylsulfonyliminosulfonylarylene, sulfoarylene, sulfoalkoxyarylene, sulfoaryloxyarylene, sulfocycloalkylene, sulfocycloalkyloxycycloalkylene and sulfoalkoxycycloalkylene.

R$^2$ represents arylene, alkylene or cycloalkylene;

R$^3$ represents a straight or branched chain alkylene having from about 2 to 12 carbon atoms, cycloalkylene, arylene ether or alkylene ether;

Z is (a) —O— or (b) —NH—; and x is 0.5 to 5.0 mole percent.

3. A latex composition as in claim 2 wherein R$^1$ represents a member selected from the group of salts consisting of alkali metal or ammonium iminodisulfonyldiphenylene, tolylsulfonyliminosulfonylphenylene, sulfophenylene, sulfophenoxyphenylene, sulfopropoxyphenylene, sulfocyclohexylene, and sulfocyclohexyloxycyclohexylene.

4. A latex composition as in claim 2 wherein R$^1$ represents a member selected from the group consisting of sodioiminodisulfonyldiphenylene: 5-(N-potassio-p-tolylsulfonyliminosulfonyl)-1,3-phenylene; 5-sodiosulfo-1,3-phenylene; 5-(3-sodiosulfopropoxy)-1,3-phenylene, 5-(p-sodiosulfophenoxy)-1,3-phenylene; 5-sodiosulfo-1,3-cyclohexylene and 5-(4-sodiosulfocyclohexyloxy)-1,3-cyclohexylene.

5. A latex composition as in claim 2 wherein said polyester is selected from the group consisting of

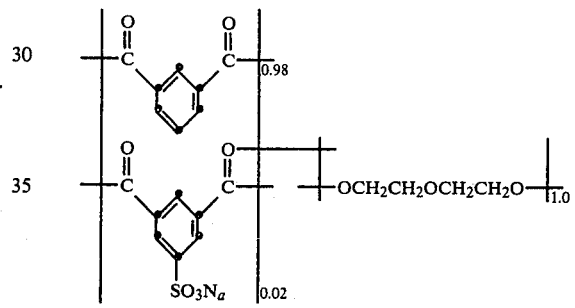

and

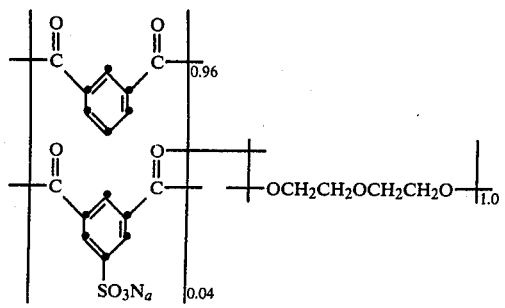

6. A latex composition as in claims 3, 4, 5, 2 or 1 wherein the polyester particles comprise at least 2% by weight of said latex composition.

7. A latex composition as in claims 1 3, 4 or 5 or 2 wherein the polyester particles comprise from 0.1 to 20% by weight of said latex composition.

8. A latex composition as in claims 1 3, 4, 5 or 2 wherein the polyester particles comprise from 10 to 20% by weight of said latex composition.

9. A latex composition as in claims 1 3, 4, 5 or 2 which is loaded with a hydrophobe.

10. A latex composition as in claims 1 3, 4, 5 or 2 which is loaded with a hydrophobe which is a substantially water-insoluble, oleophilic photographic addenda.

11. A latex composition as in claims 1 3, 4, 5 or 2 which is loaded with hydrophobes selected from the group consisting of those used to perform coupling, silver halide developing, oxidized developer scavenging, spectral sensitizing or desensitizing, diffusion transfer dye image forming, visible or ultraviolet light absorbing, and optical brightening functions when incorporated in a silver halide photographic element.

12. A latex composition as in claims 1 3, 4, 5 or 2 which is surfactant free.

13. A water-resistant layer comprising a polyester containing from about 0.5 to 5.0 mole percent dicarboxylic acid derived repeating units having a component selected from the group of salts consisting of alkali metal or ammonium iminodisulfonyl and alkali metal or ammonium sulfonate and such layer contains from 0 to 3% surfactant based on the total weight of the polyester.

14. A water-resistant layer of a latex composition loaded with a hydrophobe characterized in that said layer comprises a polyester in which the acid component contains from about 0.5 to 5.0 mole percent dicarboxylic acid derived repeating units having a component selected from the group of salts consisting of alkali metal or ammonium iminodisulfonyl and alkali metal or ammonium sulfonate.

15. A layer as in claim 13 or 14 wherein said polyester is selected from the group consisting of

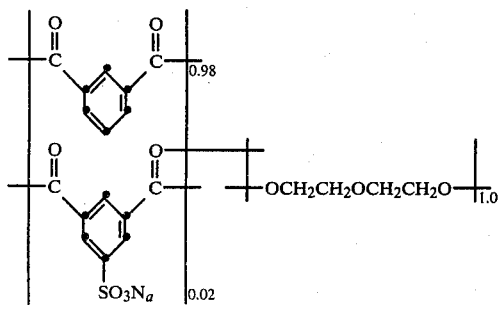

and

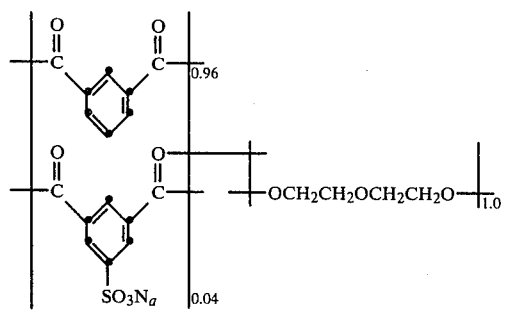

16. A layer as in claim 14 wherein the hydrophobe is a substantially water-insoluble, oleophilic photographic addenda.

17. A layer as in claim 14 wherein the hydrophobe is selected from the group consisting of those used to perform coupling, silver halide developing, oxidized developer scavenging, spectral sensitizing or desensitizing, diffusion transfer dye image forming, visible or ultraviolet light absorbing, and optical brigntening functions when incorporated in a silver halide photographic element.

18. A layer as in claims 13 or 14 wherein the polyester has the structure according to Formula I

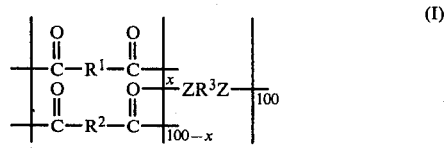

wherein
R$^1$ represents a member selected from the group of salts consisting of alkali metal or ammonium salts of iminodisulfonyldiarylene, arylsulfonyliminosulfonylarylene, sulfoarylene, sulfoalkoxyarylene, sulfoaryloxyarylene, sulfocycloalkylene, sulfocycloalkyloxycycloalkylene and sulfoalkoxycycloalkylene.

R$^2$ represents arylene, alkylene or cycloalkylene;

R$^3$ represents a straight or branched chain alkylene having from about 2 to 12 carbon atoms, cycloalkylene, arylene ether or alkylene ether;

Z is —O— or —NH— and x is 0.5 to 5.0 mole percent.

* * * * *